(12) United States Patent
Jones

(10) Patent No.: US 8,985,923 B2
(45) Date of Patent: Mar. 24, 2015

(54) BLIND FASTENER

(71) Applicant: John W. Jones, Shropshire (GB)

(72) Inventor: John W. Jones, Shropshire (GB)

(73) Assignee: Alcoa Inc., Pittsburgh, PA (US)

( * ) Notice: Subject to any disclaimer, the term of this patent is extended or adjusted under 35 U.S.C. 154(b) by 134 days.

(21) Appl. No.: 13/800,347

(22) Filed: Mar. 13, 2013

(65) Prior Publication Data

US 2014/0271024 A1    Sep. 18, 2014

(51) Int. Cl.
*F16B 19/10*    (2006.01)
*F16B 5/04*    (2006.01)

(52) U.S. Cl.
CPC ......... *F16B 19/1054* (2013.01); *F16B 19/1045* (2013.01); *F16B 5/04* (2013.01)
USPC ............................... 411/34; 411/43; 411/501

(58) Field of Classification Search
CPC .......................... F16B 19/1054; F16B 19/1045
USPC ............. 411/34, 43, 45, 361, 510, 451.3, 455
See application file for complete search history.

(56) References Cited

U.S. PATENT DOCUMENTS

| | | | |
|---|---|---|---|
| 2,863,351 A | | 12/1958 | Vaughn |
| 3,702,088 A | * | 11/1972 | Schmitt ............................ 411/44 |
| 4,222,304 A | * | 9/1980 | Yoshida et al. .................. 411/34 |
| 4,233,878 A | * | 11/1980 | McGauran et al. ............ 411/510 |
| 4,402,638 A | * | 9/1983 | Tanaka ............................. 411/34 |
| 4,556,351 A | * | 12/1985 | Wollar et al. .................... 411/38 |
| 5,207,750 A | * | 5/1993 | Rapata ............................. 411/38 |
| 6,042,313 A | * | 3/2000 | Dehlke ............................ 411/43 |
| 2007/0025829 A1 | * | 2/2007 | Sutt ................................ 411/455 |
| 2009/0053006 A1 | | 2/2009 | Hufnagl et al. |
| 2013/0243542 A1 | * | 9/2013 | Saltenberger et al. .......... 411/43 |
| 2013/0272815 A1 | | 10/2013 | Hufnagl et al. |
| 2014/0044498 A1 | | 2/2014 | Hufnagl et al. |

FOREIGN PATENT DOCUMENTS

| | | |
|---|---|---|
| AT | 269568 B | 3/1969 |
| DE | 10111404 A1 | 9/2002 |
| DE | 10204441 A1 | 8/2003 |
| GB | 1600490 A | 10/1981 |

OTHER PUBLICATIONS

International Search Report and Written Opinion issued by the European Patent Office on Jul. 28, 2014 in International (PCT) Application No. PCT/US2014/020704.

(Continued)

*Primary Examiner* — Flemming Saether
(74) *Attorney, Agent, or Firm* — Greenberg Traurig, LLP

(57) ABSTRACT

A fastener having a pin member and a sleeve. The pin includes a head, a pin tail portion, and a locking portion with a plurality of crests and roots. Each of the crests includes a first diameter, the first diameters sequentially increase along the locking portion towards the head, while the roots include a second diameter, the second diameters sequentially decrease towards the head. The sleeve has a head and a tubular portion which is deformed into a bulb that engages a workpiece. The tubular portion of the sleeve locks onto the crests and the pintail portion of the pin member breaks off at one of the grooves located substantially flush with the head of the sleeve.

17 Claims, 5 Drawing Sheets

(56) References Cited

OTHER PUBLICATIONS

Huck Fasteners, An Alcoa business, 3724 East Columbia Street, Tucson, AZ 85714 Blind Bolt Engineering Standard Diagram No. UAB100-EU, SK12771, Issued Dec. 8, 2001; 4 pages.

Huck Fasteners, An Alcoa business, 3724 East Columbia Street, Tucson, AZ 85714 Blind Bolt Engineering Standard Diagram No. UAB100-MV, SK12772, Issued Dec. 13, 2001; 3 pages.

Huck Fasteners, An Alcoa business, 3724 East Columbia Street, Tucson, AZ 85714 Blind Bolt Engineering Standard Diagram No. UABP-EU, SK12756, Issued Sep. 20, 2001; 4 pages.

Alcoa Fastening Systems, 3724 East Columbia Street, Tucson, AZ 85714 Blind Bolt Engineering Standard Diagram No. UAB130-EU, SK12711, Issued Jan. 31, 2001; 4 pages.

Alcoa Fastening Systems, 3724 East Columbia Street, Tucson, AZ 85714 Blind Bolt Engineering Standard Diagram No. UAB130-MV, SK12742, Issued Jul. 12, 2001; 3 pages.

Alcoa Fastening Systems, 3724 East Columbia Street, Tucson, AZ 85714 Blind Bolt Engineering Standard Diagram No. UAB6127-EU, SK12770, Issued Dec. 8, 2001; 3 pages.

Alcoa Fastening Systems, 3724 East Columbia Street, Tucson AZ 85714 Blind Bolt Engineering Standard Diagram No. OUAB130-EU, SK12801, Issued Apr. 19, 2004; 4 pages.

Alcoa Fastening Systems, 3724 East Columbia Street, Tucson, AZ 85714 Blind Bolt Engineering Standard Diagram No. OUAB6127-EU, SK12802, Issued Apr. 19, 2004; 3 pages.

Alcoa Fastening Systems, 3724 East Columbia Street, Tucson, AZ 85714 Blind Bolt Engineering Standard Diagram No. OUABP-EU, SK12803, Issued Apr. 19, 2004; 4 pages.

International Search Report and Written Opinion mailed on Jul. 18, 2013 in connection with international Application No. PCT/US2013/036129: 10 pages.

Huck Magna Lok® The World's Strongest, Most Reliable Blind Fastening System, Alcoa Fastening Systems, 8 pages, Dec. 2007.

Huck BOM® The Highest Strength Blind Bolt in the World, Alcoa Fastening Systems, 5 pages, Dec. 2007.

* cited by examiner

BLIND FASTENER

FIELD OF THE INVENTION

The present invention relates to a blind fastener for fastening a plurality of workpieces.

BACKGROUND OF THE INVENTION

Blind fasteners are used to join workpieces when only one side of a workpiece is accessible. It is important that the fastener maintain the designed level of strength once it is installed.

SUMMARY OF THE INVENTION

In an embodiment, a fastener comprising a pin member having a first end and a second end opposite the first end, a head at the first end, a pintail portion at the second end and having a plurality of pull grooves, and a shank intermediate the head and the pintail portion, the shank having a locking portion with a first end located proximate to the head and a second end opposite the first end of the locking portion, the locking portion having a plurality of lock grooves formed by a plurality of crests and a plurality of roots, each of the plurality of crests includes a first diameter, the first diameters of the plurality of crests sequentially increase from the second end of the locking portion to the first end of the locking portion, each of the plurality of roots includes a second diameter, the second diameters of the plurality of roots sequentially decrease from the second end of the locking portion to the first end of the locking portion; a sleeve having a tubular portion with a first end a second end opposite the first end of the tubular portion, a through bore extending from the first end of the tubular portion to the second end of the tubular portion, and a head located at the first end of the tubular portion, wherein the sleeve is adapted to receive the pin member such that the shank of the pin member is inserted within the through bore of the sleeve and the head of the pin member engages the second end of the tubular portion of the sleeve member, wherein the fastener is adapted to be installed within aligned holes of a plurality of workpieces in an installed position such that the head of the sleeve engages an accessible side of one of the workpieces, and a section of the tubular portion proximate to second end of the sleeve is deformed into a bulb that engages a blind side of another of the workpieces, and wherein the pintail portion of the pin member breaks off at one of the plurality of grooves located substantially flush with the head of the sleeve.

In an embodiment, each of the plurality of crests includes a flank angle that tapers in a direction towards the head of the pin member. In an embodiment, the flank angles of the plurality of crests are sequentially steeper from the second end of the locking portion of the pin member to the first end of the locking portion of the pin member. In an embodiment, each of the plurality of lock grooves includes a barbed shape. In an embodiment, the head of the sleeve includes a cone, and wherein when the fastener is in its installed position, the cone is deformed into the through bore of the sleeve and is clamped around the pin member. In an embodiment, the pin member includes a smooth cylindrical section intermediate the head of the pin member and the locking portion of the pin member, and wherein the bulb of the sleeve is formed adjacent to the smooth cylindrical section of the pin member. In an embodiment, the head of the pin member includes a conical-shaped underside.

In an embodiment, the through bore of the sleeve includes a first bore extending from the first end of the sleeve at a location intermediate the first and second ends of the sleeve, and a second bore extending from the second end of the sleeve to the first bore, wherein an inner diameter of the second bore is greater than the inner diameter of the first bore. In an embodiment, the inner diameter of the first bore corresponds to the smallest of the first diameters of the plurality of crests of the plurality of lock grooves, and the inner diameter of the second bore of the sleeve has an interference fit on the largest of the first diameters of the plurality of crests of the plurality of lock grooves.

In another embodiment, a pin member having a first end and a second end opposite the first end, a head at the first end, a pintail portion at the second end and having a plurality of pull grooves, and a shank intermediate the head and the pintail portion, the shank having a locking portion with a first end located proximate to the head and a second end opposite the first end of the locking portion, the locking portion having a plurality of lock grooves formed by a plurality of crests and a plurality of roots, the plurality of roots including a first group of roots and a second group of roots, each of the plurality of crests includes a first diameter, the first diameters of the plurality of crests sequentially increase from the second end of the locking portion to the first end of the locking portion, each of the plurality of roots includes a second diameter, the second diameters of the first group of roots sequentially decrease from the second end of the locking portion towards the first end of the locking portion, and the second diameters of the second group of roots being equal to one another and greater than the second diameters of the first group of roots; a sleeve having a tubular portion with a first end a second end opposite the first end of the tubular portion, a through bore extending from the first end of the tubular portion to the second end of the tubular portion, and a head located at the first end of the tubular portion, wherein the sleeve is adapted to receive the pin member such that the shank of the pin member is inserted within the through bore of the sleeve and the head of the pin member engages the second end of the tubular portion of the sleeve member, wherein the fastener is adapted to be installed within aligned holes of a plurality of workpieces in an installed position such that the head of the sleeve engages an accessible side of one of the workpieces, and a section of the tubular portion proximate to second end of the sleeve is deformed into a bulb that engages a blind side of another of the workpieces, and wherein the pintail portion of the pin member breaks off at one of the plurality of grooves located substantially flush with the head of the sleeve.

BRIEF DESCRIPTION OF THE DRAWINGS

For a more complete understanding of the present invention, reference is made to the following detailed description of exemplary embodiments considered in conjunction with the accompanying drawings, in which.

DETAILED DESCRIPTION OF THE DRAWINGS

Figure 1:
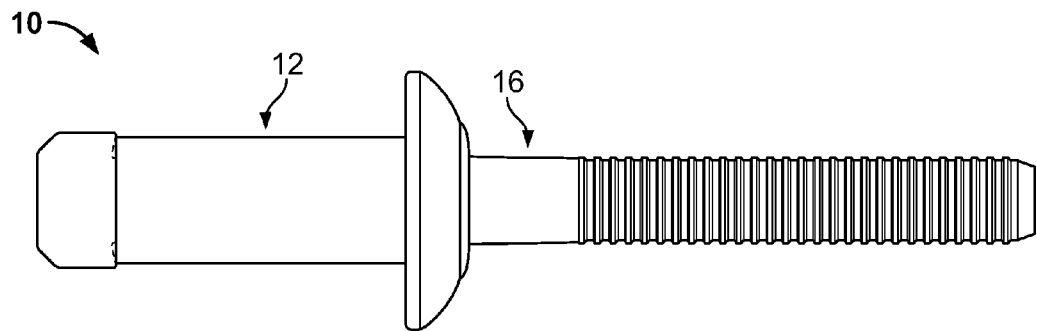
FIG. 1 is a side view of a blind fastener which includes a pin member and a sleeve, and which is constructed in accordance with one embodiment of the present invention.
Figure 2:
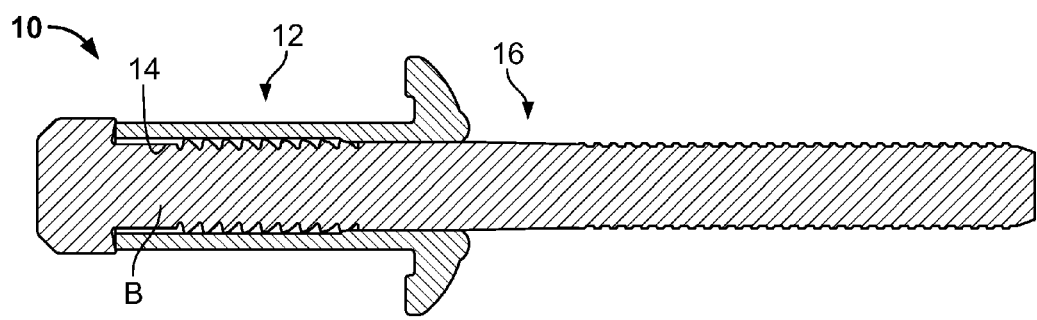
FIG. 2 is a cross-sectional view of the blind fastener shown in FIG. 1.

FIGS. 1 and 2 illustrate a blind fastener 10 (hereinafter "the fastener 10") which is constructed in accordance with one embodiment of the present invention. In an embodiment, the fastener 10 includes a sleeve 12 having a through bore 14, and a pin member 16 (i.e., "pin") that is adapted to be positioned within the through bore 14 of the sleeve. In an embodiment, the pin 16 is made from suitable materials known in the art, such as steel or titanium or other suitable metals and metal alloys. In an embodiment, the sleeve 12 is made from suitable materials known in the art, such as aluminum or 1010 steel, or other suitable metals and metal alloys.

Figure 3:
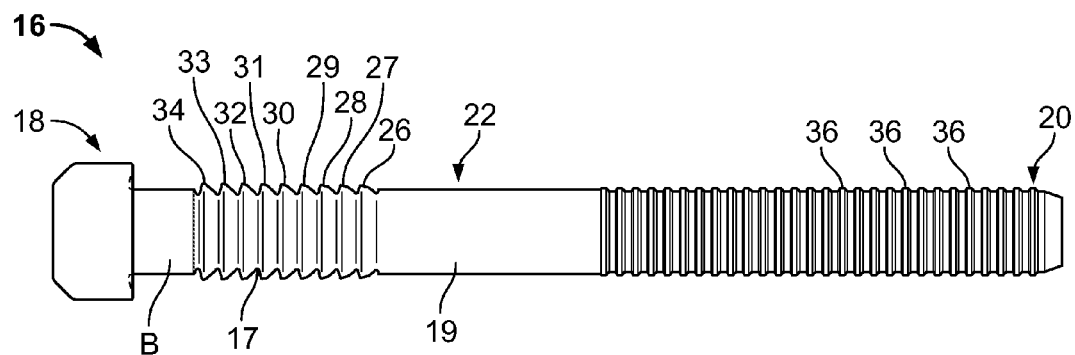
FIG. 3 is a side view of the pin member shown in FIG. 1.
Figure 4:
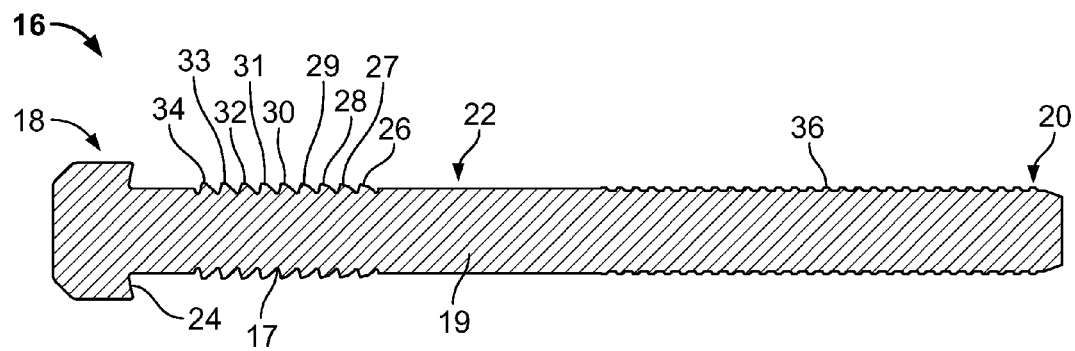
FIG. 4 is a cross-sectional view of the pin member shown in FIG. 3.

Referring to FIGS. 3 and 4, in an embodiment, the pin 16 includes a head 18 at one end, a pintail portion 20 opposite the head 18 at another end, and a cylindrical-shaped shank 22 that extends between the head 18 and the pintail portion 20. In an embodiment, the head 18 is an enlarged head. In an embodiment, the shank 22 includes a locking portion 17 located proximate to the head 18 and having a plurality of lock grooves 26-34 extending from one end to an opposite end thereof, pull grooves 36 located on the pintail 20, and a smooth shank portion 19 intermediate the locking portion 17 and the pintail portion 20. In an embodiment, the lock grooves 26-34 have a constant pitch. In an embodiment, each of the lock grooves 26-34 have a barbed-shape. In an embodiment, the head 18 of the pin 16 has a cone-shaped underside 24, for purposes that are disclosed hereinbelow.

Figure 5:
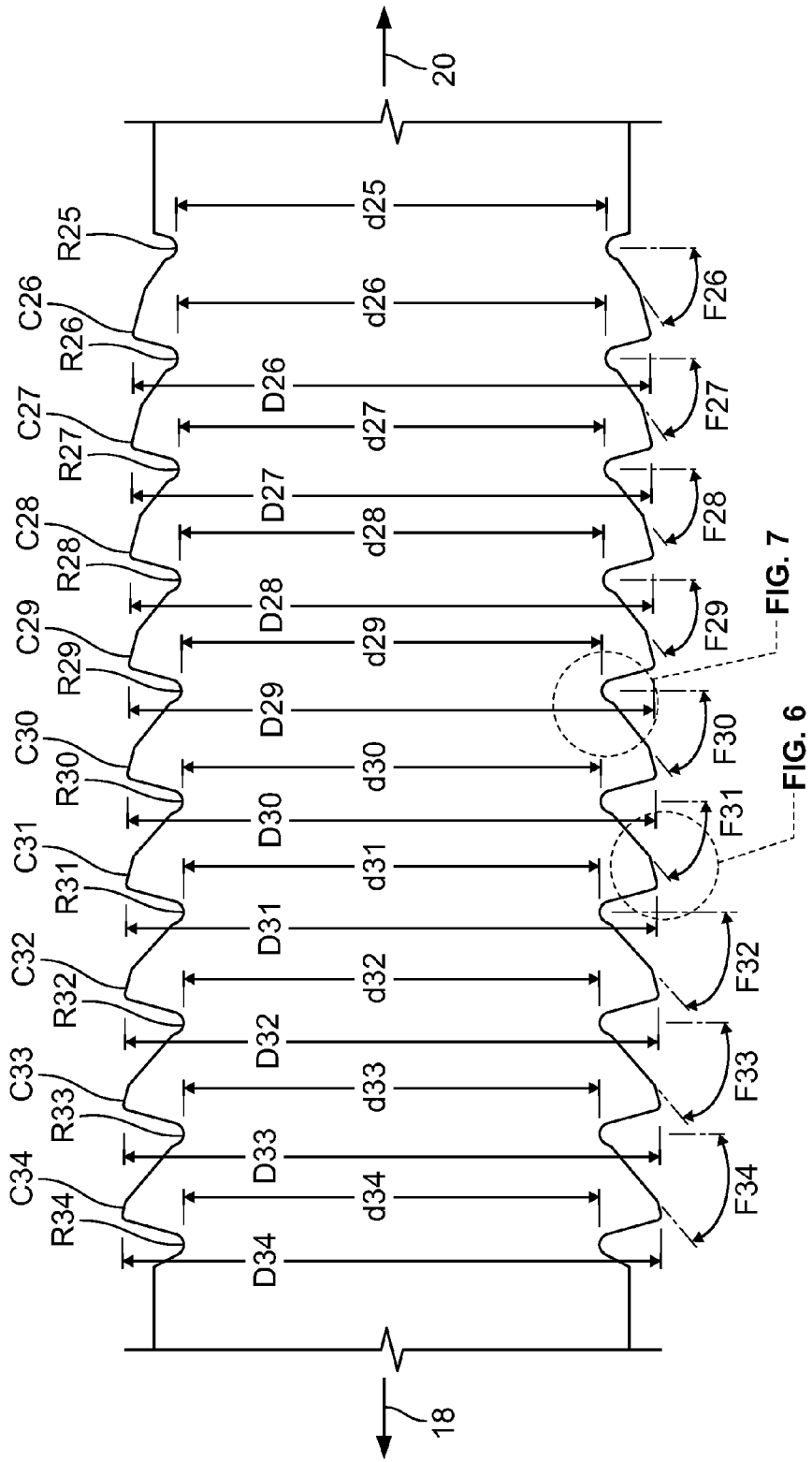
FIG. 5 is a side view of a section of the shank of the pin member, showing crests and roots of the lock grooves shown in FIGS. 2 through 4.
Figure 6:
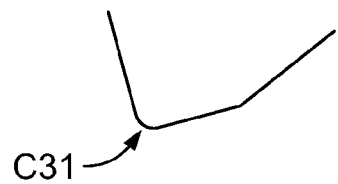
FIG. 6 is an enlarged side view of the profile of a portion of a crest of a lock groove.
Figure 7:
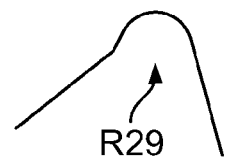
FIG. 7 is an enlarged side view of the profile of a portion of a root of a lock groove.

Referring to FIGS. 5 through 7, each of the lock grooves 26-34 includes a corresponding crest C26-C34, respectively, and a corresponding root R25-R34, respectively. FIGS. 6 and 7 illustrate embodiments of profiles of the crest C31 and the root R29, respectively. Referring specifically to FIG. 5, in an embodiment, the crests C26-C34 include diameters D26-D34, respectively. In an embodiment, the diameters D26-D34 of the crests C26-C34 sequentially increase towards the head 18, e.g., D27 being greater than D26, D28 being greater than D27, etc. In an embodiment, the roots R25-R34 include diameters d25-d34, respectively. In an embodiment, the diameters d25-d34 of the roots R25-R34 sequentially decrease towards the head 18, e.g., d26 is less than d25, d27 is less than d26, etc. In an embodiment, the diameters d25-d34 of the roots R25-R34 sequentially decrease towards the head 18, e.g., d26 is less than d25, d27 is less than d26, etc. In an embodiment, diameters d32-d34 of the roots R32-R34 are constant and equal to one another and are greater than the diameters d25-d31 of the roots R25-R31. In an embodiment, the constant diameters d32-d34 of the roots R32-34 establish an area along the shank 22 where it would not break during installation of the fastener 10. In another embodiment, only diameters d33 and d34 are equal to one another. In an embodiment, the pin 16 includes a smooth cylindrical section B which is a gap that is located proximate the exterior surface of shank 22 that is adjacent to the head 18 of the pin 16. In an embodiment, the section B does not include any grooves, and it facilitates the formation of a bulb (i.e., bulbing of the sleeve 12) during the installation of the fastener 10 (see FIGS. 9 and 10). More particularly, the section B facilities the pin 16 retention and bulb profile in the fastener 10, as disclosed in greater detail hereinafter.

Figure 10:
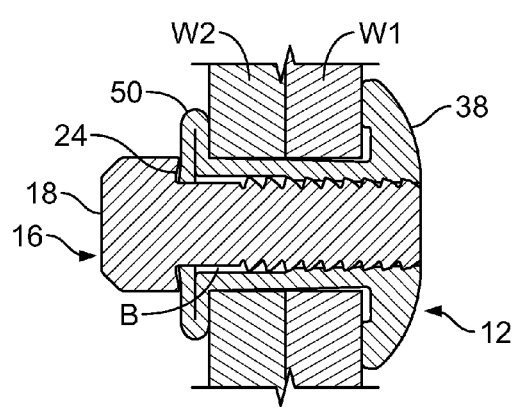
FIG. 10 is a cross-sectional view of the blind fastener installed on the workpieces with the pintail portion of the pin detached from the pin.
Figure 11:
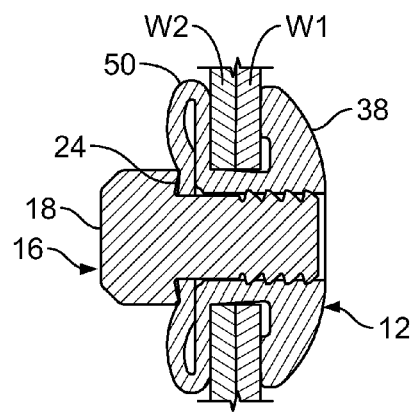
FIG. 11 is an illustration which is similar to FIG. 10 except the thickness of the joined workpieces is smaller.

In an embodiment, the lock grooves 26-34 of the pin 16 include reverse tapers (i.e., the tapers are oriented toward the head 18 of the pin 16). In an embodiment, the variation of the reverse tapers of the crests C26-C34 is achieved by varying the angle of the flank (i.e., the flank is the side of the crest furthest away from the head 18). Referring again to FIG. 5, flank angles of the lock grooves 26-34, which are denoted as F26-F34, become progressively steeper from one end of the locking portion towards the head 18. The increases in the flank angles F26-F34 enable the crests C26-34 to have progressively larger diameters D26-D34, respectively, towards the head 18, while the roots R25-R34 have progressively smaller diameters d25-d34, respectively, towards the head 18. Once again, in an embodiment, the diameters d32-d34 have a constant diameter. In an embodiment, the reduction in root diameters d25-d34 ensures that the pintail portion 20 of the pin 16 breaks substantially flush with or slightly below the head 18 of the sleeve 12 (see FIGS. 10 and 11), so as to prevent sharp edges from protruding above the head 18. In an embodiment, the increase in the crest diameters D26-D34 provides increasing swaging pressure as the pin 16 is pulled into the sleeve 12 during installation.

Figure 8:
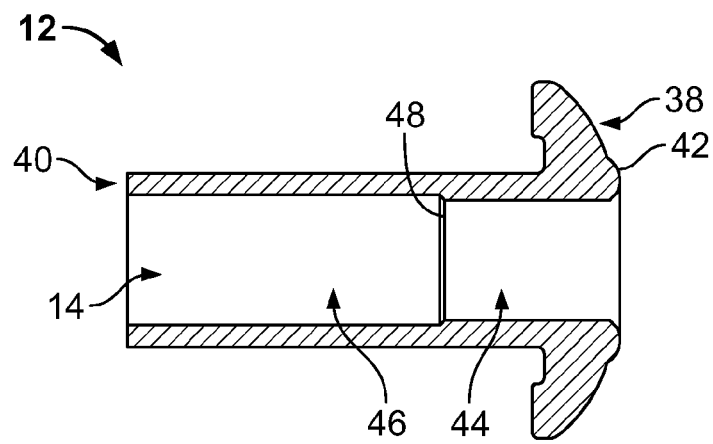
FIG. 8 is a cross-sectional view of the sleeve shown in FIGS. 1 and 2.

Referring to FIG. 8, the sleeve 12 includes a head 38 and a tubular portion 40. In an embodiment, the head 38 includes a protruding cone 42. In an embodiment, the sleeve 12 includes a first plain bore 44 and a second plain bore 46, which are separated from one another by a bore step 48. In an embodiment, the inside diameter of the second plain bore 46 is larger than the inside diameter of the first plain bore 44. The inside diameter of the first plain bore 44 corresponds to the smallest diameter D26 of the crest C26 of the lock groove 26. In an embodiment, the larger bore diameter of the second plain bore 46 has an interference fit on the largest crest diameter D34. The bore step 48 is positioned to establish the minimum grip length from under the head 38 of the sleeve 12. (i.e., the minimum grip of the fastener). In an embodiment, the sleeve 12 can be fully annealed, end annealed or band annealed, as required.

Figure 9:
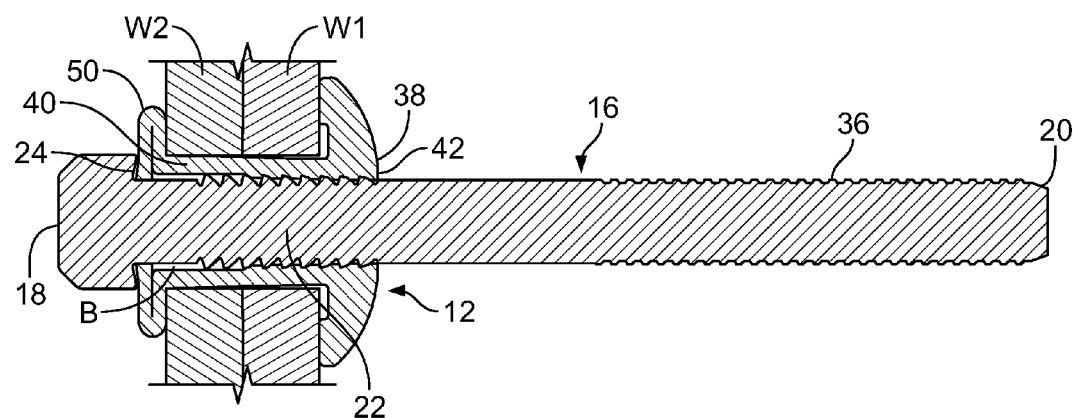
FIG. 9 is a cross-sectional view of the blind fastener installed on a plurality of workpieces with the pintail portion of the pin member not yet detached therefrom.

In operation, FIG. 9 illustrates the fastener 10 positioned in aligned openings in a plurality of workpieces W1, W2, in which the head 38 of the sleeve 12 engages the accessible side of the workpiece W1, and the tubular portion 40 of the sleeve protrudes from the non-accessible (blind) side of the workpiece W2. In embodiments, the workpieces W1, W2 are made of steel, aluminum, an aluminum alloy, other metals or metallic alloys, composites, or combinations thereof. The application of force is applied on the pull grooves 36 of the pin 16 by the grip of the installation tool (not shown), and by a simultaneous application of the tool's reactive force on the protruding cone 42 of the head 38 of the sleeve 12. These forces result in the tubular portion 40 of the sleeve being driven and a section of which is deformed into a bulb 50, which is positioned adjacent to the section B along the shank 22 and under the cone-shaped underside 24 of the head 18 of the pin 16. The bulb 50 is adapted to engage the blind side of the workpiece W2. The bulb 50 improves pin 16 retention, and assists in the pin 16 breaking proximate to the head 38 of the sleeve 12 (see FIGS. 10-11).

When the fastener 10 is completely installed, the tubular portion 40 of the sleeve 12 will lock onto the largest lock groove crests proximate to the head 18 of the pin 16 (for example, crests C32-C34 when such crests have a constant diameter). This holds the pin 16 and the sleeve 12 together during use. Also, when the fastener 10 is completely installed, the sleeve 12 forms the bulb 50 evenly, assisted by the cone-shaped underside 24 of the head 18 of the pin 16. Simultaneously, during installation, the tapered crests C26-34 of the lock grooves 26-34 swage into the first plain bore 44 of the sleeve 12 progressively. This has the effect of creating increased friction between pin 16 and the sleeve 12. The outside diameter of the sleeve 12 is also expanded to close the aligned opening hole clearance of the workpieces W. When the bulb 50 of the sleeve 12 is fully bulbed, the installation force will break the pin 16. The pin 16 will break at the nearest exposed groove 26-34 to the head 38 of the sleeve 12, and this is assisted by the protruding cone 42 of head 38 being flattened into the first plain bore 44. The displaced material of the protruding cone 42 of head 38 of the sleeve 14, which is displaced into the first plain bore 44, clamps on the pin 16, which increases the retention of the pin 16 and the fastener's 10 tensile strength.

It will be understood that the embodiments described herein are merely exemplary and that a person skilled in the art may make many variations and modifications without departing from the spirit and scope of the invention. All such variations and modifications are intended to be included within the scope of the invention as defined in the appended claims.

What is claimed is:

1. A fastener, comprising:
a pin member having a first end and a second end opposite the first end, a head at the first end, a pintail portion at the second end and having a plurality of pull grooves, and a shank intermediate the head and the pintail portion, the shank having a locking portion with a first end located proximate to the head and a second end opposite the first end of the locking portion, the locking portion having a plurality of lock grooves formed by a plurality of crests and a plurality of roots, each of the plurality of lock grooves including a barbed shape, each of the plurality of crests includes a first diameter and a flank angle that tapers in a direction towards the head, the flank angles of the plurality of crests being sequentially steeper from the second end of the locking portion to the first end of the locking portion, the first diameters of the plurality of crests sequentially increase from the second end of the locking portion to the first end of the locking portion, each of the plurality of roots includes a second diameter, the second diameters of the plurality of roots sequentially decrease from the second end of the locking portion to the first end of the locking portion;
a sleeve having a tubular portion having a first end a second end opposite the first end of the tubular portion, a through bore extending from the first end of the tubular portion to the second end of the tubular portion, and a head located at the first end of the tubular portion,
wherein the sleeve is adapted to receive the pin member such that the shank of the pin member is inserted within the through bare of the sleeve and the head of the pin member engages the second end of the tubular portion of the sleeve member, wherein the fastener is adapted to be installed within aligned holes of a plurality of workpieces in an installed position such that the head of the sleeve engages an accessible side of one of the workpieces, and a section of the tubular portion proximate to second end of the sleeve is deformed into a bulb that engages a blind side of another of the workpieces, and wherein the pintail portion of the pin member breaks off at one of the plurality of grooves located substantially flush with the head of the sleeve.

2. The fastener of claim 1, wherein the head of the sleeve includes a cone, and wherein when the fastener is in its installed position, the cone is deformed into the through bore of the sleeve and clamps around the pin member.

3. The fastener of claim 2, wherein the pin member includes a smooth cylindrical section intermediate the head of the pin member and the locking portion of the pin member, and wherein the bulb of the sleeve is formed adjacent to the smooth cylindrical section of the pin member.

4. The fastener of claim 3, wherein the head of the pin member includes a conical-shaped underside.

5. The fastener of claim 3, wherein the through bore of the sleeve includes a first bore extending from the first end of the sleeve at a location intermediate the first and second ends of the sleeve, and a second bore extending from the second end of the sleeve to the first bore, wherein an inner diameter of the second bore is greater than the inner diameter of the first bore.

6. The fastener of claim 5, wherein the inner diameter of the first bore corresponds to the smallest of the first diameters of the plurality of crests of the plurality of lock grooves, and the inner diameter of the second bore of the sleeve has an interference fit on the largest of the first diameters of the plurality of crests of the plurality of lock grooves.

7. A fastener, comprising:
a pin member having a first end and a second end opposite the first end, a head at the first end, a pintail portion at the second end and having a plurality of pull grooves, and a shank intermediate the head and the pintail portion, the shank having a locking portion with a first end located proximate to the head and a second end opposite the first end of the locking portion, the locking portion having a plurality of lock grooves formed by a plurality of crests and a plurality of roots, the plurality of roots including a first group of roots and a second group of roots, each of the plurality of crests includes a first diameter, the first diameters of the plurality of crests sequentially increase from the second end of the locking portion to the first end of the locking portion, each of the plurality of roots includes a second diameter, the second diameters of the first group of roots sequentially decrease from the second end of the locking portion towards the first end of the locking portion, and the second diameters of the second group of roots being equal to one another and greater than the second diameters of the first group of roots;
a sleeve having a tubular portion having a first end a second end opposite the first end of the tubular portion, a through bore extending from the first end of the tubular portion to the second end of the tubular portion, and a head located at the first end of the tubular portion,
wherein the sleeve is adapted to receive the pin member such that the shank of the pin member is inserted within the through bore of the sleeve and the head of the pin member engages the second end of the tubular portion of the sleeve member, wherein the fastener is adapted to be installed within aligned holes of a plurality of workpieces in an installed position such that the head of the sleeve engages an accessible side of one of the workpieces, and a section of the tubular portion proximate to second end of the sleeve is deformed into a bulb that engages a blind side of another of the workpieces, and wherein the pintail portion of the pin member breaks off at one of the plurality of grooves located substantially flush with the head of the sleeve.

8. The fastener of claim 7, wherein the second group of roots includes two of the roots.

9. The fastener of claim 7, wherein the second group of roots includes three of the roots.

10. The fastener of claim 7, wherein each of the plurality of crests includes a flank angle that tapers in a direction towards the head of the pin member.

11. The fastener of claim 10, wherein the flank angles of the plurality of crests are sequentially steeper from the second end of the locking portion of the pin member to the first end of the locking portion of the pin member.

12. The fastener of claim 11, wherein each of the plurality of lock grooves includes a barbed shape.

13. The fastener of claim 12, wherein the head of the sleeve includes a cone, and wherein when the fastener is in its installed position, the cone is deformed into the through bore of the sleeve and clamps around the pin member.

14. The fastener of claim 13, wherein the pin member includes a smooth cylindrical section intermediate the head of the pin member and the locking portion of the pin member, and wherein the bulb of the sleeve is formed adjacent to the smooth cylindrical section of the pin member.

15. The fastener of claim 14, wherein the head of the pin member includes a conical-shaped underside.

16. The fastener of claim 14, wherein the through bore of the sleeve includes a first bore extending from the first end of the sleeve at a location intermediate the first and second ends of the sleeve, and a second bore extending from the second end of the sleeve to the first bore, wherein an inner diameter of the second bore is greater than the inner diameter of the first bore.

17. The fastener of claim 16, wherein the inner diameter of the first bore corresponds to the smallest of the first diameters of the plurality of crests of the plurality of lock grooves, and the inner diameter of the second bore of the sleeve has an interference fit on the largest of the first diameters of the plurality of crests of the plurality of lock grooves.

* * * * *

UNITED STATES PATENT AND TRADEMARK OFFICE
CERTIFICATE OF CORRECTION

| | | |
|---|---|---|
| PATENT NO. | : 8,985,923 B2 | Page 1 of 1 |
| APPLICATION NO. | : 13/800347 | |
| DATED | : March 24, 2015 | |
| INVENTOR(S) | : John W. Jones | |

It is certified that error appears in the above-identified patent and that said Letters Patent is hereby corrected as shown below:

Claims

Column 5, Claim 1, line 61, delete "bare" and insert --bore--;

Column 5, Claim 1, line 67, insert --the-- after "to";

Column 6, Claim 7, line 64, insert --the-- after "to.".

Signed and Sealed this
Twenty-fifth Day of August, 2015

Michelle K. Lee
*Director of the United States Patent and Trademark Office*